United States Patent [19]
DeJoy

[11] Patent Number: 5,282,248
[45] Date of Patent: Jan. 25, 1994

[54] TIME LIMITED SIGNAL CONDUCTION SYSTEM

[76] Inventor: Victor P. DeJoy, 49 Lenox Terr., West Orange, N.J. 07052

[21] Appl. No.: 763,141

[22] Filed: Sep. 20, 1991

[51] Int. Cl.$^5$ ............................................. H04K 1/00
[52] U.S. Cl. ................................. 380/16; 380/9; 380/10
[58] Field of Search .............. 380/9, 10, 16; 358/349, 358/86; 329/107, 161; 333/104, 262; 346/81

[56] References Cited

U.S. PATENT DOCUMENTS

| | | | |
|---|---|---|---|
| 3,230,386 | 1/1966 | Riebman et al. | 333/262 |
| 3,234,560 | 8/1966 | Sargent, Jr. | 346/81 |
| 3,335,421 | 8/1967 | Sargent, Jr. et al. | 380/16 |
| 3,629,732 | 12/1971 | King et al. | 333/104 |
| 3,638,032 | 1/1972 | Kippenhan | 333/262 |
| 3,736,368 | 5/1973 | Vogelman et al. | 380/16 |
| 4,254,306 | 3/1981 | Sekiguchi et al. | 379/161 |
| 4,494,143 | 1/1985 | Lovick et al. | 380/16 |
| 4,571,560 | 2/1986 | Dobrovolny | 358/86 |
| 4,584,684 | 1/1986 | Nagasawa et al. | 358/86 |
| 4,630,313 | 1/1986 | Damoci | 358/86 |
| 4,654,869 | 3/1987 | Smith et al. | 379/107 |
| 4,663,664 | 5/1987 | Ragan et al. | 380/16 |
| 4,783,846 | 1/1988 | Vachob | 358/86 |
| 4,807,286 | 2/1989 | Wiedemer | 380/16 |
| 4,878,245 | 10/1989 | Bradley et al. | 380/10 |
| 4,993,066 | 2/1991 | Jenkins | 380/16 |
| 5,020,129 | 5/1991 | Martin et al. | 358/86 |
| 5,031,045 | 7/1991 | Kawasaki | 358/86 |
| 5,051,837 | 9/1991 | McJunkin | 358/349 |
| 5,144,663 | 9/1992 | Kudelski et al. | 380/16 |

*Primary Examiner*—Salvatore Cangialosi
*Attorney, Agent, or Firm*—Jones, Day, Reavis & Pogue

[57] ABSTRACT

A time limited signal conduction switch 13 powered by an internal energy source 16 with a given life span. A lithium inorganic cell 16 is used as the internal energy source and is coupled to a specially designed switch 13 which allows signal conduction for a predetermined period of time. The life span of the switch 13 will be limited by the current drain on the battery 16.

12 Claims, 1 Drawing Sheet

TIME LIMITED SIGNAL CONDUCTION SYSTEM

FIELD OF THE INVENTION

The present invention relates to a time limited switch in general and in particular to a time limited switch which allows a signal to be transmitted from an input to an output only over a period of time predetermined by the time limited switch.

BACKGROUND OF THE INVENTION

It is well known that the pay-per-view market in the cable television industry is limited to cable systems with highly advanced technology (addressable circuitry). Pay-per-view service occurs when a particular event is presented by a cable system and the customers of the system pay a premium to view the event. Currently, this requires the cable systems to have computerized decoders in place at each customer's home. These decoders are extremely expensive. Moreover, various hardware and software must be located at the cable system head end in order to operate the decoders.

It would be advantageous to have an inexpensive device to offer customers to enable them to receive a temporary service such as a special movie, boxing match and the like for which the customer could pay for the one presentation.

The present invention overcomes the need for computerized decoders in place at each customer's home and the various hardware and software that must be at the cable system's head end to run the decoders. In addition, it provides an inexpensive device which can be coupled between the cable service and the TV monitor in the customer's home that will allow the cable output to be coupled to the TV monitor for a predetermined period of time and then the circuit opened.

In one embodiment of the invention, a switch selectively couples an input signal to a load only for a predetermined period of time established solely by the switch. This is accomplished with a time limited signal conduction circuit for selectively providing a signal path from an input to a load. The conduction circuit includes an electronically operated switch inserted between the input and the load for opening the signal path to prevent the signal from being transmitted to the load. The novel switch is DC operated from a self-contained power supply that has a predetermined power rating such that the time period of the preselected current drain from the battery can be predetermined. The battery is electrically isolated from the external inputs and outputs to the switch but it provides a bias to RF current controlled resistors, when the switch is activated, to allow an input signal to pass to the output of the switch during the time the battery maintains its charge.

In another embodiment of the invention, the device can be purchased by a user as a ticket to enable a TV monitor to receive and view a CATV program transmitted as a scrambled RFTV signal. The ticket has a housing having an input terminal for removable coupling to the RFTV cable and an output terminal for removable coupling to the TV monitor. A time limited switch and a descrambler unit are contained in the housing and are coupled between the input and the output terminals for enabling a scrambled CATV signal to be unscrambled and coupled to the TV monitor only for a time period predetermined by the time limited switch. An insulator or nonelectric conducting slab of any well-known type is inserted in the battery circuit and operable by the user to unalterably activate the time limited switch such that the scrambled RFTV signal is passed by the switch to the descrambler only for the predetermined period of time of the life of the battery, thus enabling a viewer to view a selected program that lasts for any known predetermined period of time such as a movie which may last for 2 or 2½ hours.

Thus it is an object of the present invention to provide a time limited signal conduction circuit including an electronically operated switch inserted between a signal input and a load for opening the signal path to prevent the signal from being transmitted to the load and also having means coupled to the switch for selectively causing the switch to close the signal path only for a predetermined period of time, thereby allowing the signal to be transmitted to the load only during the predetermined time period.

It is also an object of the present invention to provide a time limited signal conduction circuit in which current controlled devices such as diodes or RF current controlled resistors are selectively biased by a self-contained power source at the option of the user to cause the diodes or RF current controlled resistors to conduct only during the time the battery has power.

It is still another object of the present invention to provide a disposable, self-contained electronic switch and descrambler system for use in a CATV system which will selectively provide a signal path that enables a purchaser of the switch to view only a selected scrambled video program.

It is yet another object of the present invention to provide a ticket for purchase by a user to enable a TV monitor to receive and view a CATV program transmitted as a scrambled RFTV signal and wherein the ticket is discarded after the program being viewed is completed.

SUMMARY OF THE INVENTION

Thus the present invention relates to a time limited conduction circuit for selectively providing a signal path from an input terminal to a load comprising electronically operated switch means inserted between the input terminal and the load for opening the signal path to prevent the signal from being transmitted to the load. Means are coupled to the switch means for selectively causing the switch means to close the signal path only for a predetermined time period, thereby allowing the signal to be transmitted to the load only during the predetermined time period.

The invention also relates to a disposable, self-contained electronic switch and descrambler system for use in a CATV system for selectively providing a signal path that enables a purchaser of the switch to view a selected scrambled video program, the self-contained system comprising an input terminal for receiving a scrambled cable RFTV signal, an output terminal for coupling a descrambled RFTV signal to a TV monitor for viewing, a time limited switch coupled to the input terminal for passing substantially only the scrambled video program to its output, means forming part of the time limited switch for selectively and unalterably activating the time limited switch such that the scrambled video program is passed by the switch only for a predetermined period of time, and a descrambling circuit coupled to the time limited switch for receiving the scrambled video program for the predetermined period of time, descrambling the signal and passing the descrambled signal from said output terminal to the TV monitor for viewing.

The invention also relates to a disposable ticket for purchase by a user to enable a TV monitor to receive and view a CATV program transmitted as a scrambled RFTV signal, the ticket comprising a housing having an input terminal for removable coupling to the RFTV cable and an output terminal for removable coupling to the TV monitor, a time limited switch and a descrambler unit are contained in the housing and coupled between the input and the output terminals for enabling a scrambled CATV signal to be unscrambled and coupled to the TV monitor only for a time period predetermined by the time limited switch. A battery forms part of the time limited switch and is selectively operable by the user to unalterably activate the time limited switch such that the scrambled RFTV signal is passed by the switch to the descrambler only for the predetermined period of time.

BRIEF DESCRIPTION OF THE DRAWINGS

These and other objects of the present invention will be more fully disclosed in the following detailed description when taken in conjunction with the drawings in which like numerals represent like elements and in which.

DETAILED DESCRIPTION OF THE DRAWINGS

Figure 1:
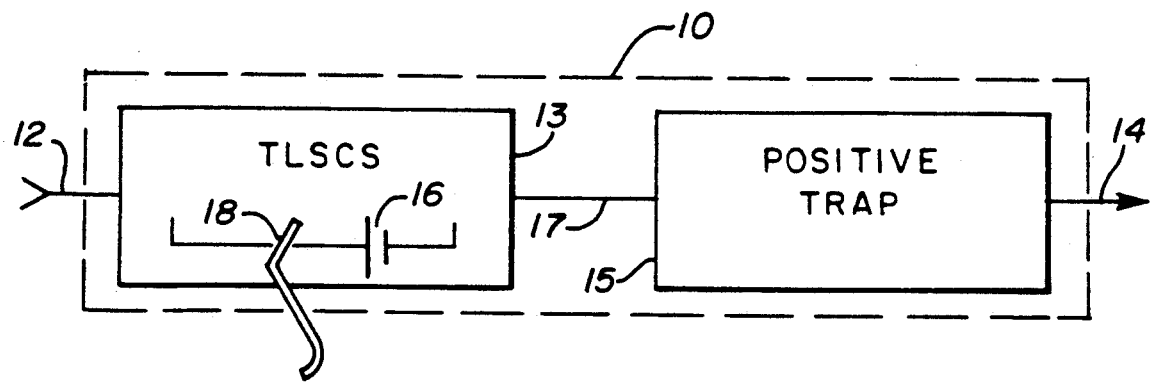
FIG. 1 is a generalized block diagram of the present invention when used as a disposable electronic ticket that includes a self-contained electronic switch and descrambler system.

FIG. 1 is a generalized block diagram of the present invention when it is used as a disposable electronic ticket including a self-contained electronic switch and descrambler system. The system 10 couples an input 12 to an output 14. The input 12 may be, for example, a CATV/RFTV signal. The input signal on line 12 is coupled to a time limited signal conduction circuit 13 that is normally nonconducting and prevents the signal on input line 12 from passing through the circuit 13 to line 17. However, when the battery 16 is irreversibly activated by any well-known device, such as the removal of a nonconductor or insulator 18 which is removably held between contacts in the battery circuit, the battery is unalterably coupled to the time limiting circuit 13 and causes the input signal 12 to pass to output line 17. The signal on line 17 is coupled to descrambler unit 15 where it is descrambled and the descrambled output on line 14 is coupled to the TV monitor for viewing. Thus the unit 10 is a self-contained unit which may include a housing in which the time limited switch 13 and the descrambler 15 may be mounted and potted therein with an epoxy as well-known in the art to form a disposable or throw-away unit. When the battery 16 is fully discharged, the switch 13 again closes, thus preventing any further signal from being coupled to the descrambler 15. The descrambler 15 is any well-known type of descrambler such as that described, for example only, in U.S. Pat. No. 4,074,311 for Television Security System granted Feb. 14, 1978.

Figure 2:
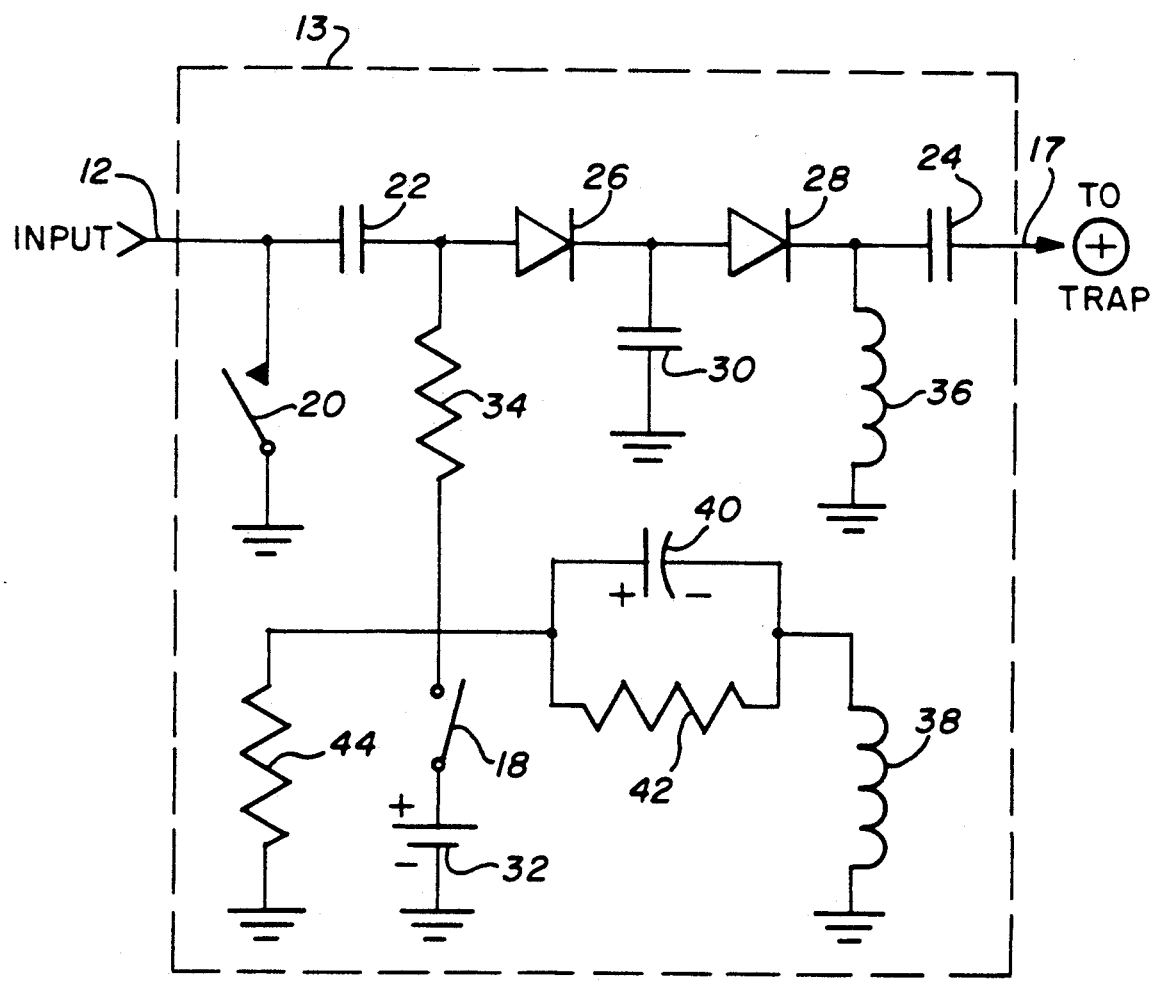
FIG. 2 is a circuit diagram of the time limited signal conduction circuit of the present invention that selectively provides a signal path from an input terminal to a load only for a predetermined period of time.

The details of the time limited signal conduction circuit 13 are shown in FIG. 2. It should be noted that a switch terminal 20 is coupled to the input line 12 and normally provides a closed path to ground so that there is no possibility for the input signal on line 12 to pass through the time limited switch 13 to the output 17. Thus, switch terminal 20 provides optional added RF attenuation when the TLSCS 13 is in the open circuit condition. In addition, current controlled resistors or diodes 26 and 28 prevent conduction of the signal from the input 12 to the output 17 until they are biased by battery 32. Diodes 26 and 28 may be, for example only, PIN diodes that are well-known in the art. An insulator or nonconductive element, as described in relation to FIG. 1, forms a switch 18 in the battery circuit which prevents battery 32 from conducting until the insulator or nonconductive element 18 is removed by the user or purchaser as described in relation to FIG. 1, thus closing switch 18 and connecting the battery 32 to the circuit. In that case, the diodes 26 and 28 are properly biased so that they conduct. Thus, capacitors 22 and 24 and current control resistors or diodes 26 and 28 form the high frequency signal path coupling the input RF signal on line 12 to the output line 17. By using a lithium inorganic cell as the battery 32 in the specially designed switch 13, signal conduction can be achieved only for a predetermined period of time. That period of time is determined by the current drain on the battery 32 and thus the life of the battery 32. When the battery 32 is activated by the removal of the insulator or nonconductive slab element, thus closing switch 18, the circuit will allow the input signal on line 12 to be coupled to the output line 17 for the life or available current hours of the battery 32.

When the current controlled resistors or diodes 26 and 28 are properly biased with the battery 32, the signal will pass through the device. With a particular PIN diode, one can maintain about 2 dB insertion loss in the "on" state and at least 55 dB of attenuation in the "off" state. Capacitors 22 and 24 prevent powering or biasing of the diodes 26 and 28 from an external power source. They act as a DC current block. Resistor 44 acts as a current limiter so that the lifetime of the battery, and thus the switch lifetime, can be predetermined. Relay 38 and its associated components 20, 40 and 42 are optional for added high frequency attenuation. Relay coil 38 is energized upon the battery 32 being coupled to the circuit and switch 20, normally closed to shunt the input signal to ground, is opened, thus allowing the signal to pass from the input terminal 12 through capacitor 22. Because it takes a greater current to open switch 20 than to maintain it in the open position, capacitor 40 is placed in the circuit to allow a surge current from the battery to energize relay coil 38, thus opening switch 20. After the capacitor 40 is charged, and the switch 20 is opened, resistor 42 limits the amount of current flowing to the relay coil 38, thus increasing the life of the battery 32. Coil 36 at the output of diode 28 provides a direct current path to ground so that the diodes 26 and 28 will be forward biased by the battery 32. Coil 36 also prevents any RF signal from leaking to ground. Capacitor 30, between diodes 26 and 28, serves as a lowpass filter when the switch 13 is biased off and adds attenuation during the off time of switch 13.

Capacitors 22 and 24 may be 0.1 microfarad, capacitor 30 may be 6 pF, capacitor 40 may be equal to or greater than 33 microfarads (bipolar), resistor 34 may be equal to or approximately 750 ohms, and resistor 44 may be in the range of 100–500 ohms. The value of resistor 44 will vary depending upon the time of duration desired for the switch 13 to operate. Thus resister 44 can provide a greater or less load on battery 32 to preselect the predetermined time period that the switch 13 conducts. The battery may be a 3.6 volt DC lithium inorganic type battery. Coil 36 may equal 6.8 mH and the relay coil 38 is any well-known relay coil which maintains the switch 20 in the open condition when it is energized. The diodes D1 and D2 may be of the type of RF current controlled resistors designated HP5082-3081.

Thus the circuit 13 illustrated in FIG. 2 is a time limited signal conduction circuit for selectively providing a signal path from the input terminal 12 to the output line 17. It is an electrically operated switch 13 inserted between the input 12 and the output 17 for normally opening the signal path to prevent the signal from being transmitted from input 12 to output 17. The battery 32 and diodes 26 and 28, when selectively operated by the removal of the insulator 18 in the circuit of the battery 32, selectively cause the switch 13 to close the signal path between input terminal 12 and output line 17 only for a predetermined time period determined by the battery 32 and the current limiting resistor 44, thereby allowing the signal to be transmitted from the input terminal 12 to the output 17 ONLY during the predetermined time period. Because the circuit 13 is potted in a housing, and the insulator 18 protrudes from the housing, when it is removed by the user to power the circuit, the switch is unalterably and irreversibly activated and the user has no further control over the switch 13. It will simply conduct from the input terminal 12 to the output 17 until the battery 32 is discharged. At that time the switch 13 can be thrown away.

The circuit of FIG. 1 provides a disposable self-contained electronic switch and descrambler system 10 for use in a CATV system by selectively providing a signal path between the input terminal 12 and the output terminal 14 that enables a purchaser of the switch and descrambler system 10 to view a selected scrambled video program. Thus, the device 10 would be available in a supermarket, drugstore or other outlet for use by the purchaser. The device may also be distributed by the CATV system when purchased by the CATV subscriber. The input terminal 12 is simply coupled to the CATV cable and the output terminal 14 is coupled to the TV set or monitor. When the insulator or slab 18 is removed by the user, the incoming signal on terminal 12 will be passed through time limited switch 13 to the descrambler 15 which provides a descrambled output on terminal 14 to the TV set. If the program is two hours long, the system 10 is designed such that the battery will last at least two hours so that the program can be viewed appropriately. Of course, the circuit can be designed to last for days if necessary to watch events such as the Olympics. The price of the unit, of course, varies, depending on the time the switch is to be used as well as the type of program to be viewed.

It is to be understood, of course, that the time limited switch 13 could be used in applications other than in a CATV descrambling system. It can be used for a time limited signal conduction circuit in telephone circuitry, radio and the like.

Thus, there has been disclosed a time limited signal conduction circuit for selectively providing a signal path from an input to a load. The circuit includes a switch that can be selectively and unalterably activated with a power source contained in the switch and isolated from the input and output lines. The switch continues to conduct signals from the input to the output so long as the power source provides energy to the switch. When the power source is depleted, the switch may be thrown away or otherwise disposed.

When coupled with a descrambler system, the switch can be used in a CATV system for enabling a purchaser of the switch to view a selected scrambled video program. The switch is designed to have sufficient power to accommodate the time period of a particular program.

Finally, the novel invention provides a ticket for purchase by a user to enable a TV monitor to receive and view a CATV program transmitted as a scrambled RFTV signal. The switch and the descrambler unit are contained in a housing and sealed with epoxy to form a throw-away unit.

The foregoing specification describes only the embodiments of the invention shown and/or described. Other embodiments may be articulated as well. The terms and expressions used, therefore, serve only to describe the invention by example and not to limit the invention. It is expected that others will perceive differences which, while different from the foregoing, do not depart from the scope of the invention herein described and claimed. In particular, any of the specific instructional elements described may be replaced by any other known element having equivalent function.

I claim:

1. A disposable self-contained electronic switch and descrambler for use in a CATV system for selectively providing a signal path that enables a purchaser of the switch to view a selected scrambled video program, said self-contained system comprising:

an input terminal for receiving a scrambled CATV RF signal;

an output for coupling a descrambled TVRF signal to a TV monitor for viewing;

a time limited switch having an input and an output, the switch input being coupled to said input terminal for receiving and passing said scrambled CATV RF signal to the switch output;

means forming part of said time limited switch for selectively and unalterably activating said time limited switch such that said scrambled CATV RF signal is passed by said switch only for a predetermined period of time; and a descrambling circuit coupled to the time limited switch for receiving said scrambled CATV RF signal for said predetermined period of time; descrambling the signal and passing the descrambled signal to the TV monitor for viewing.

2. A system as in claim 1 wherein said time limited switch comprises:

at least one biasable diode in said signal path between said switch input and said switch output for preventing said scrambled CATV RF signal from being transmitted to said descrambling circuit until said at least one diode is properly biased; and blocking capacitor means on each side of said at least one diode to prevent a power source external to said switch from properly biasing said at least one diode into conduction and passing said scrambled CATV RF signal.

3. A system as in claim 2 further comprising:

a DC power source contained in said switch for properly biasing said at least one diode into conduction, thus passing said scrambled CATV RF signal to said switch output; and means for selectively and unalterably activating said DC power source to cause said proper bias of said at least one diode such that once said power source is activated, the proper bias to said at least one diode is unchangeable.

4. A system as in claim 3 wherein said DC power source is a lithium inorganic battery coupled to said at least one diode.

5. A system as in claim 4 wherein said selective coupling means is a removable insulating slab in said battery circuit which, prior to removal, prevents current flow from said battery and which, when removed, unalterably allows current flow from said battery to provide proper bias to said at least one diode and cause conduction of said at least one diode.

6. A system as in claim 5 further comprising:
a current limiting resistance in circuit with said battery for causing a preselected current drain on said battery; and
said battery is of a known power rating such that the time period of said preselected current drain from said battery can be predetermined thereby providing an electronically operated switch that, when activated, will selectively conduct said scrambled CATV RF signal to said switch output only for said predetermined time period.

7. A system as in claim 6 further including:
normally closed switch contacts coupling said scrambled CATV RF signal to ground so as to increase the attenuation of the scrambled CATV RF signal; and
a relay coil coupled to said battery for operating said normally closed switch contacts such that when said battery is activated said normally closed switch contacts open to pass said scrambled CATV RF signal to said at least one diode.

8. A system as in claim 7 further comprising two series coupled diodes in said signal path.

9. A system as in claim 8 wherein said switch and said descrambler system is self-contained in a housing filled with epoxy.

10. A ticket for purchase by a user to enable a TV monitor to receive and view a specific CATV program transmitted on a cable as a scrambled RFTV signal, the ticket comprising:
a housing having an input terminal for removable coupling to said cable to receive said scrambled RFTV signal and an output terminal for removable coupling to said TV monitor;
a time limited switch and a descrambler unit contained in said housing and coupled between said input and said output terminals to form a signal path for enabling a received scrambled RFTV signal to be unscrambled and coupled to the TV monitor only for a time period predetermined by said time limited switch; and
switch operating means forming part of said time limited switch and operable by said user to unalterably activate said time limited switch such that said scrambled RFTV signal is passed by said switch to said descrambler only for said predetermined period of time.

11. A ticket as in claim 10 wherein said time limited switch comprises:
at least one biasable diode in said signal path for preventing said scrambled RFTV signal for being transmitted to said descrambler until said at least one diode is properly biased; and
blocking capacitor means on each side of said at least one diode to prevent a power source external to said time limited switch from properly biasing said at least one diode into conduction and passing said scrambled RFTV signal.

12. A ticket as in claim 11 further comprising:
a lithium inorganic DC battery in a circuit to said at least one diode for providing power to bias said at least one diode into conduction thus passing said scrambled RFTV signal to said descrambler; and
user operated means for selectively and unalterably activating said DC battery to cause proper bias of said at least one diode such that once said DC battery is activated, the proper bias to said at least one diode is unchangeable until said battery power is sufficiently depleted.

* * * * *